(12) United States Patent
Thiel

(10) Patent No.: US 11,904,651 B2
(45) Date of Patent: Feb. 20, 2024

(54) METHOD FOR OPERATING A VENTILATION DEVICE, VENTILATION DEVICE, CHARGING DEVICE WITH A VENTILATION DEVICE AND MOTOR VEHICLE

(71) Applicant: AUDI AG, Ingolstadt (DE)

(72) Inventor: Holger Thiel, Wettstetten (DE)

(73) Assignee: Audi AG, Ingolstadt (DE)

( * ) Notice: Subject to any disclaimer, the term of this patent is extended or adjusted under 35 U.S.C. 154(b) by 626 days.

(21) Appl. No.: 17/047,799

(22) PCT Filed: Jan. 7, 2019

(86) PCT No.: PCT/EP2019/050203
§ 371 (c)(1),
(2) Date: Oct. 15, 2020

(87) PCT Pub. No.: WO2019/219246
PCT Pub. Date: Nov. 21, 2019

(65) Prior Publication Data
US 2021/0162838 A1 Jun. 3, 2021

(30) Foreign Application Priority Data
May 18, 2018 (DE) ...................... 10 2018 207 841.6

(51) Int. Cl.
*B60H 1/00* (2006.01)
*B60H 1/24* (2006.01)
(52) U.S. Cl.
CPC ..... *B60H 1/00271* (2013.01); *B60H 1/00828* (2013.01); *B60H 1/24* (2013.01); *B60H 2001/003* (2013.01)

(58) Field of Classification Search
CPC .. B60H 1/00271; B60H 1/00828; B60H 1/24; B60H 2001/003; B60H 1/00764; B60H 2001/00614; H02J 50/10; H05K 7/20863
See application file for complete search history.

(56) References Cited

U.S. PATENT DOCUMENTS

| 8,739,564 B2 | 6/2014 | Major et al. |
| 10,439,423 B2 | 10/2019 | Lachnitt et al. |

(Continued)

FOREIGN PATENT DOCUMENTS

| CN | 101537790 A | 9/2009 |
| CN | 105946501 A | 9/2016 |

(Continued)

OTHER PUBLICATIONS

International Search Report and Written Opinion of the International Searching Authority directed to related International Patent Application No. PCT/EP2019/050203, dated May 28, 2019, with attached English-language translation; 27 pages.

(Continued)

*Primary Examiner* — Edelmira Bosques
*Assistant Examiner* — Michael James Giordano
(74) *Attorney, Agent, or Firm* — Sterne, Kessler, Goldstein & Fox P.L.L.C.

(57) ABSTRACT

This disclosure relates to a method for operating a ventilation device for providing an air flow. An equipment parameter value of an equipment element of a motor vehicle and a vehicle parameter value of the motor vehicle are detected. Then, the ventilation device is activated subject to the detected equipment parameter value and the detected vehicle parameter value. To activate the ventilation device, a rotational speed of a fan of the ventilation device is set, where (Continued)

the rotational speed is varied subject to the detected equipment parameter value and the detected vehicle parameter value.

17 Claims, 2 Drawing Sheets

(56) References Cited

U.S. PATENT DOCUMENTS

| | | |
|---|---|---|
| 2004/0069546 A1 | 4/2004 | Lou et al. |
| 2007/0298315 A1 | 12/2007 | Yamamoto et al. |
| 2008/0300749 A1 | 12/2008 | Hartmann et al. |
| 2014/0293538 A1* | 10/2014 | Han .................. H02J 50/90 |
| | | 361/690 |
| 2014/0335771 A1 | 11/2014 | Kikuchi |
| 2017/0047769 A1* | 2/2017 | Kim ................ H02J 7/00309 |
| 2018/0212453 A1* | 7/2018 | Kwon ............... H02J 7/007192 |
| 2020/0021125 A1 | 1/2020 | Thiel et al. |

FOREIGN PATENT DOCUMENTS

| | | |
|---|---|---|
| CN | 107139677 A | 9/2017 |
| DE | 102004030705 B3 | 12/2005 |
| DE | 102011119505 A1 | 5/2013 |
| DE | 102015112127 A1 | 9/2016 |
| DE | 102016216900 B3 | 10/2017 |
| FR | 2116995 A5 * | 12/1970 |
| JP | 2003326961 A * | 11/2003 |
| JP | 2004224205 A | 8/2004 |
| JP | 2009280063 A | 12/2009 |
| WO | WO-2019080953 A1 * | 5/2019 |

OTHER PUBLICATIONS

International Preliminary Report on Patentability directed to related International Patent Application No. PCT/EP2019/050203, completed Jan. 22, 2020, with attached English-language translation; 11 pages.

* cited by examiner

METHOD FOR OPERATING A VENTILATION DEVICE, VENTILATION DEVICE, CHARGING DEVICE WITH A VENTILATION DEVICE AND MOTOR VEHICLE

TECHNICAL FIELD

The invention relates to a method for operating a ventilation device for providing an air flow. The invention also includes a ventilation device which can be operated according to the method according to the invention. Finally, the invention also relates to a charging apparatus having such a ventilation device and a motor vehicle having a charging apparatus.

BACKGROUND

Air conditioning systems for motor vehicles are known from the general prior art, which are used to air-condition an interior of the motor vehicle in order to produce a desired interior climate for vehicle occupants.

In addition to an air conditioning system, further venting devices can also be used in motor vehicles.

For example, DE 10 2004 030 705 B3 describes an air supply device for a vehicle seat of a motor vehicle. The air supply device includes a control device for controlling a blower and a heating element connected downstream of the blower. When the vehicle is unlocked, a vehicle door is opened, and/or a convertible top switch is actuated to open the convertible top, the control device initiates preconditioning of the heating element. When there is a switch-on signal for the air supply device, the control device ends the preconditioning and switches on the heating element and the blower. The heating element and the blower are then controlled by the control device subject to the speed and the outside temperature.

Instead of a seat heater, in a further use of a venting device, DE 10 2016 216 900 B3 and DE 10 2015 112 127 A1 describe charging apparatuses for charging a mobile terminal device with integrated ventilation. The integrated ventilation is used when the charging apparatus is in operation for sufficient cooling of the charging apparatus and the mobile terminal device.

The disadvantage of these different venting devices is that the corresponding fans generate undesired sound and the function of the fans creates an additional draft. Both the sound of the fan and the additional draft can be perceived as annoying and unpleasant for a user, or driver, or vehicle occupant of a motor vehicle, as a result of which the user comfort can be considerably impaired.

DE 10 2011 119 505 A1 discloses a fan arrangement for a motor vehicle having a fluidic interface, where the fluidic interface is arranged on a vehicle component having a blower feed, having a fluidic counter-interface, where the fluidic counter-interface is arranged on a function module, where the fluidic interface and the fluidic counter-interface form a fluidic connection in a coupling position, so that the blower air is passed from the blower feed into the function module, where the fluidic interface assumes an open state in the coupling position, where a flow of blower air through the fluidic interface is possible, where the fluidic interface automatically and/or autonomously assumes a blocked state in a release state in which the fluidic interface and the fluidic counter-interface are separated from one another, where a flow of blower air through the fluidic interface is blocked.

BRIEF DESCRIPTION OF THE DRAWINGS/FIGURES

DETAILED DESCRIPTION

Figure 1:
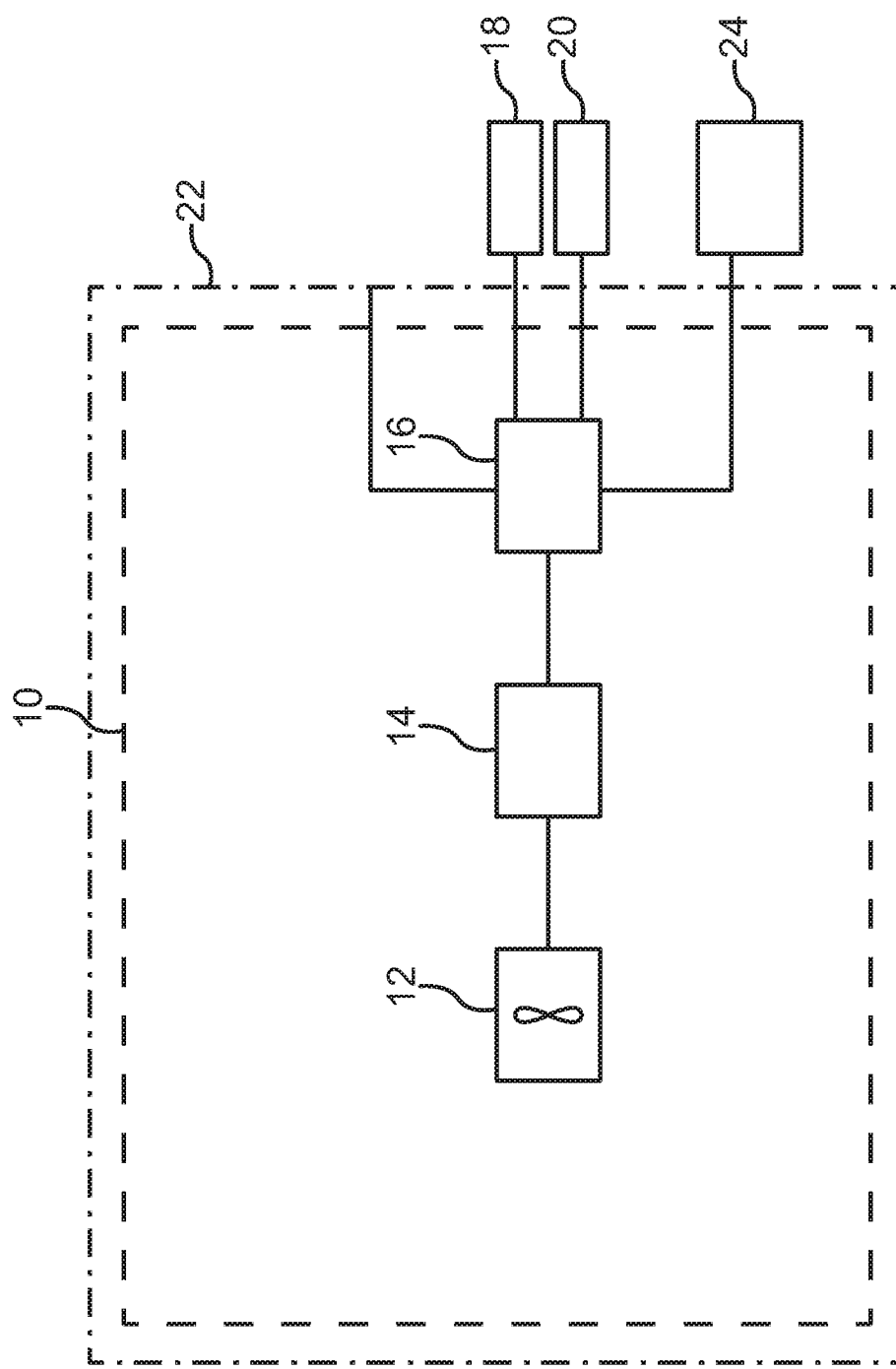
FIG. 1 illustrates a schematic representation of a ventilation device for a motor vehicle, according to some aspects of this disclosure.

The object of the present invention is to provide a method for operating a ventilation device and a ventilation device, which can be operated with particularly little interference or needs-based and at the same time particularly simply, effectively and reliably, in particular with regard to user comfort.

This object is achieved by a method for operating a ventilation device and by a ventilation device having the features of the independent claims. Advantageous embodiments having expedient and non-trivial developments of the invention are specified in the dependent claims.

Accordingly, the invention proposes a method for operating a ventilation device for providing an air flow, in which first an equipment parameter value of an equipment element of a motor vehicle and a vehicle parameter value of the motor vehicle are detected. "Ventilation device" means, in particular, a device or apparatus, which is designed to generate an air flow or a draft, according to some aspects. "Detecting" particularly means measuring, or determining, or recording, according to some aspects. The equipment element is, in particular, a technical and/or electronic component or device that is installed in the motor vehicle or arranged or housed therein, according to some aspects.

In a further method step, the ventilation device is activated subject to the detected equipment parameter value and the detected vehicle parameter value. "Activating" means, in particular, switching on, or setting, or controlling the ventilation device, according to some aspects. In order to activate the ventilation device, a rotational speed of a fan of the ventilation device is set, where the rotational speed is varied at least subject to the detected equipment parameter value and the detected vehicle parameter value. In other words, fan control takes place at least subject to the detected equipment parameter value and the detected vehicle parameter value. The fan is in particular a ventilator, according to some aspects. A ventilator is an externally driven turbomachine, which usually conveys a gaseous dispersion medium, for example air, by means of an impeller rotating in a housing. The ventilation device can also have more than one fan, which can be set or controlled accordingly subject to the detected equipment parameter value and the detected vehicle parameter value.

Because the control of the fan is dependent on the detected equipment parameter value and the detected vehicle parameter value, the ventilation device can only be activated subject to specific framework conditions. As a result, the fan is used in a more targeted manner, as a result of which the ventilation device can be operated particularly quietly, trouble-free, and efficiently. The targeted use of the ventilation device can also significantly reduce consumption and the associated costs. The targeted use of the ventilation device is also associated with a significantly higher level of user comfort.

An advantageous embodiment provides that a device parameter value of a device system to be ventilated with the ventilation device, in particular as an equipment element, is detected as the equipment parameter value. In other words, a value of the device system can be detected as the device parameter value, the device system being submitted to or cooled by the air flow generated by the ventilation device. A temperature, in particular on a device surface of at least one device of the device system, is preferably detected as the device parameter value. The temperature can for example be detected or measured by a sensor, in particular a temperature sensor or a thermometer.

The invention is based on the knowledge that a comparatively large amount of heat loss can arise during a charging process, which can lead to greater heating of the device system. Against this background, it can often be sufficient to make the activation of the ventilation device dependent on the fact that such a charging process is in progress. Correspondingly, an advantageous development of the invention provides that a status of the device system is detected as the device parameter value. In this case, a charging process and/or readiness for charging of the at least one device of the device system can preferably be detected or queried as the status.

By activating the ventilation device subject to a state of the device system, which is to be submitted to an airflow or cooled by the ventilation device, and by detecting a predefined device parameter value, there is the advantage that the ventilation device can specifically be set according to the device system and can thus be operated particularly efficiently and reliably.

The ventilation device can be activated in particular subject to specific framework conditions or boundary conditions of the device. Thus, it is advantageously provided that the ventilation device is activated at a temperature, in particular on the device surface of at least one device of the device system, of over 30° C., particularly preferably at a temperature of over 40° C. Additionally or alternatively, the ventilation device can be activated if a charging process and/or readiness for charging of the at least one device is detected as the status. "Charging process" means, in particular, that the detection device detects whether the at least one device is being charged or whether the at least one device is being charged or is charging a further device, i.e., is being supplied with electrical energy. "Readiness for charging" means, in particular, that the detection device detects whether the device system is ready to be charged or whether the further device is ready to be charged.

The at least one device of the device system can be a charging apparatus, which is designed to charge a further device of the device system. The charging apparatus is preferably designed for wirelessly charging a rechargeable electrical energy storage of a mobile terminal device; the further device. For example, the equipment parameter value can include a value of the charging apparatus, which is designed to charge the further device or to supply it with electrical energy. Alternatively, the at least one device can also be the mobile terminal device that is charged by the charging apparatus. The device system can thus include the charging apparatus and/or the mobile terminal device, in particular the ventilation device is controlled subject to the device parameter values thereof. It is only necessary to provide the air flow at a temperature of at least 30° C. and/or a predefined device status. This allows the ventilation device to be operated particularly effectively and reliably.

According to an advantageous development, it is provided that the vehicle parameter value includes an interior parameter value in an interior of the motor vehicle. In other words, a state in the interior of the motor vehicle or the vehicle cabin can be detected. An interior temperature and/or a noise level can preferably be detected as the interior parameter value. "Noise level" means, in particular, a sound pressure level or a value of a background noise or a volume in the interior of the motor vehicle. The interior temperature and/or the noise level can be detected by a detection device. To detect the interior temperature, the detection device can for example have a sensor, in particular a temperature sensor or a thermometer. To detect the noise level, the detection device can preferably have one or more microphones. In particular, the fan can be activated when the interior temperature and/or the noise level reaches a predefined threshold value or limit value. The threshold value of the interior temperature and/or the threshold value of the noise level can be stored in a storage of a control device which controls or sets the fan. For example, the threshold value of the temperature can have a value between 20° C. and 40° C. The threshold value of the noise level can for example be between 30 dB and 65 dB, particularly preferably 40 dB.

A further advantageous embodiment provides that the vehicle parameter value also includes a speed of the motor vehicle, which is detected as a vehicle parameter value. The fan can be controlled or regulated subject to the speed, e.g., subject to a speed of the motor vehicle. In particular, the fan can be activated when the speed reaches a predefined threshold value or limit value. The speed threshold value can also be stored in the storage of the control device that controls or sets the fan. The ventilation device is advantageously activated from a speed of the motor vehicle of 5 km/h, in particular at a speed between 5 km/h and 30 km/h, particularly preferably from a speed of 30 km/h. The invention is also based on the knowledge that, with increasing vehicle speed, e.g., the speed of the motor vehicle, the noise level in the interior of the motor vehicle increases. Correspondingly, a particularly preferred embodiment provides that the rotational speed of the fan increases or grows or is raised as the speed of the motor vehicle increases. Additionally or alternatively, it can be provided that the activation of the ventilation device takes place subject to the noise level, in particular in the surroundings of the ventilation device, so that the higher the noise level, the greater the fan can be operated with. As a result, the fan can be operated without the fan noise contributing to the noise level in the interior of the motor vehicle and thus particularly good and adequate ventilation and cooling are provided by the ventilation device.

An advantageous development provides that, subject to the detected equipment parameter value and the vehicle parameter value, the rotational speed of the fan of the ventilation device is set between 10% and 100%, in particular the maximum rotational speed of the fan, in particular between 30% and 100%, particularly preferably 30%, or 60%, or 100%. Particularly preferably, the rotational speed of the fan, can be set or regulated in stages subject to the detected equipment parameter value and the vehicle parameter value. By setting the rotational speed of the fan as a percentage or in steps, the ventilation device can be set particularly precisely and as required.

In addition to the equipment parameter value and the vehicle parameter value, a setting of an air conditioning system of the motor vehicle is advantageously detected, the rotational speed of the fan being varied subject to the detected equipment parameter value, the detected vehicle parameter value, and the detected setting of the air conditioning system. When the setting of the air conditioning system is detected, it is possible, for example, to check whether the air conditioning system is switched on or off or whether a predefined blower power of the air conditioning system is set. For example, the fan can be activated when the motor vehicle is stationary, e.g., a speed of the motor vehicle of 0 km/h is detected, but the air conditioning system with a blower level or blower power is set to 6 of 12.

A further advantageous embodiment provides that the ventilation device is deactivated again when the equipment parameter value and/or the vehicle parameter value again falls below a predefined threshold value. In other words, if at least the equipment parameter value or the vehicle parameter value should reach a lower threshold value, or limit value, or minimum value, then the fan of the ventilation device is controlled in such a way that the fan is switched off, e.g., in particular no more air flow is provided. The ventilation device can remain deactivated until the predefined threshold value of the equipment parameter value and/or the vehicle parameter value is reached or exceeded again, in particular subject to which the ventilation device is activated.

The invention also includes a ventilation device for providing an air flow. The ventilation device includes a fan which is designed to generate an air flow. Furthermore, the ventilation device has a detection device, which is designed to detect at least one equipment parameter value of an equipment element of a motor vehicle and a vehicle parameter value of the motor vehicle. Furthermore, the ventilation device includes a control device, which is designed to activate the ventilation device subject to at least the detected equipment parameter value and the detected vehicle parameter value. Furthermore, the control device is designed to set a rotational speed of the fan to activate the ventilation device, the control device varying or setting the speed subject to the detected equipment parameter value and the detected vehicle parameter value.

The invention also includes a charging apparatus, in particular as an equipment element, for wirelessly charging a rechargeable electrical energy storage of a device, in particular a mobile terminal device, with such a ventilation device.

Finally, the invention also relates to a motor vehicle with such a charging apparatus. The motor vehicle is preferably designed as a motorized vehicle, in particular as a passenger vehicle.

The invention also includes the combinations of the features of the described embodiments.

The invention also includes developments of the ventilation device according to the invention, the charging apparatus according to the invention, and of the motor vehicle according to the invention, which have features as were previously described in conjunction with the developments of the method according to the invention. It is for this reason that the relevant further developments of the ventilation device according to the invention, the charging apparatus according to the invention, and the motor vehicle according to the invention are not described again herein.

Figure 2:
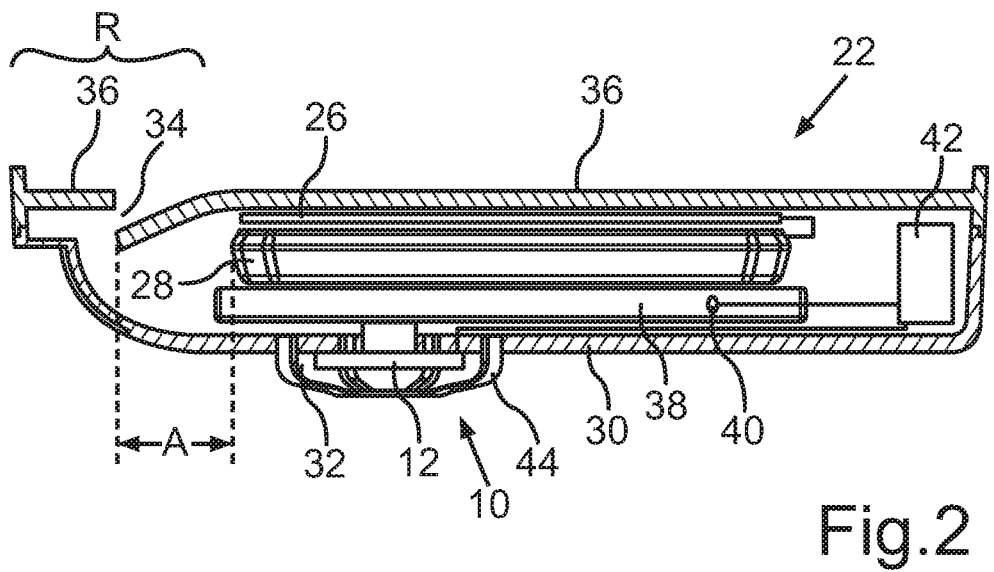
FIG. 2 illustrates a schematic representation of the ventilation device in a charging apparatus for a mobile terminal device, according to some aspects of this disclosure.
Figure 3:
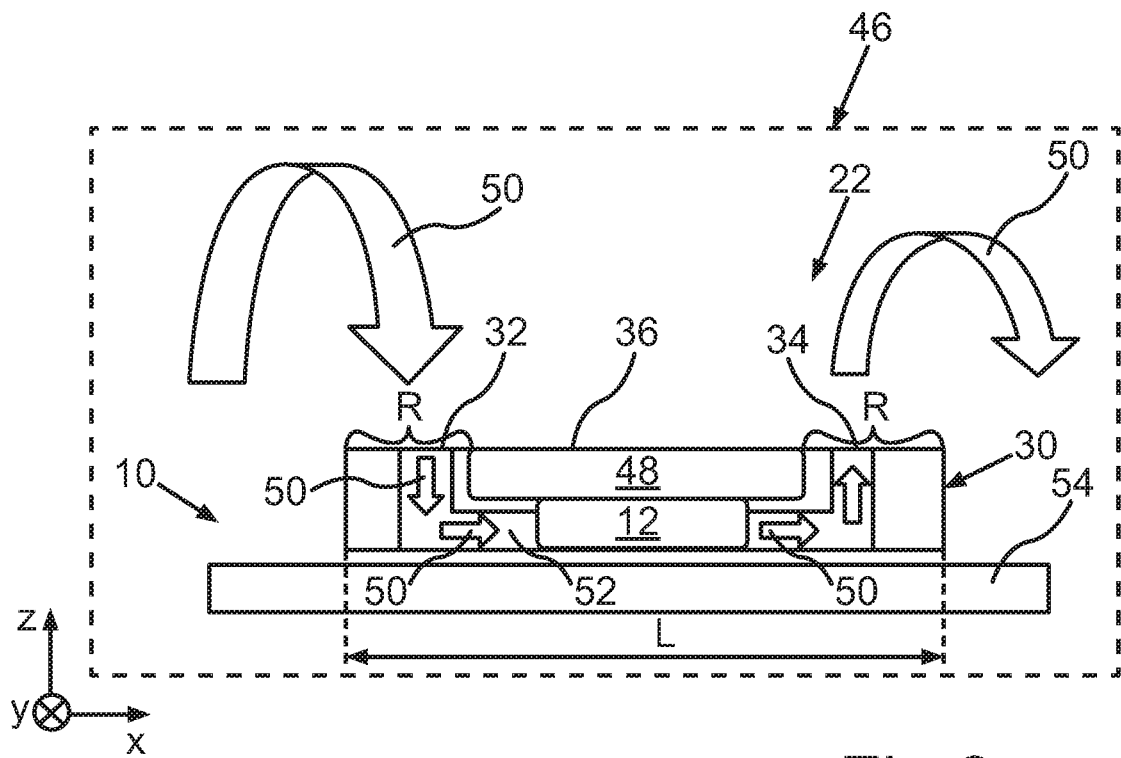
FIG. 3 illustrates a schematic representation of the ventilation device in a further embodiment of a charging apparatus for a mobile terminal device, according to some aspects of this disclosure.

Embodiments of the invention are described below by way of example. In the drawings:

FIG. 1 is a schematic representation of a ventilation device for a motor vehicle;

FIG. 2 is a schematic representation of the ventilation device in an embodiment of a charging apparatus for a mobile terminal device; and FIG. 3 is a schematic representation of the ventilation device in a further embodiment of a charging apparatus for a mobile terminal device.

In the figures, the same reference signs refer to functionally identical elements.

FIG. 1 shows a ventilation device 10 in a schematic representation. The ventilation device 10 can be part of a charging apparatus 22 for wireless charging of a rechargeable electrical energy storage of a device, which is explained in more detail in FIGS. 2 and 3. The ventilation device 10 or the charging apparatus 22 having the ventilation device 10 can be arranged in a motor vehicle (not shown in FIG. 1). For example, the charging apparatus 22 can be arranged on a central console of the motor vehicle or integrated therein.

The ventilation device 10 has a fan 12, a control device 14, and a detection device 16. The detection device 16 is designed to detect a vehicle parameter value and an equipment parameter value and/or a setting of an air conditioning system 24 of the motor vehicle. For example, an interior parameter value of the motor vehicle can be detected as the vehicle parameter value. The interior parameter value can include an interior temperature and/or a noise level in an interior 18 of the motor vehicle, in particular a vehicle cabin of the motor vehicle. To detect the interior temperature, the detection device 16 can, for example, have a temperature sensor. To detect the noise level in the interior 18 of the motor vehicle, the detection device 16 can have a microphone, for example. Additionally or alternatively, the vehicle parameter value can include a speed of the motor vehicle, which can be detected by the detection device 16.

The equipment parameter value can include a device parameter value of a device 20 of a device system which is ventilated or cooled by the fan 12 of the ventilation device 10. The device parameter value can include, for example, a temperature, in particular on a surface of the device 20, and/or a device status of the device 20. The temperature can be detected by a further temperature sensor of the detection device 16. The device status of device 20 can be detected, for example, by a control device of device 20 and transmitted or sent to detection device 16. A charging process and/or readiness for charging of the device 20 can be detected as the device status. The device can, for example, be a portable mobile terminal device, such as a smartphone or a tablet computer. The mobile terminal device can be charged by the charging apparatus 22.

Additionally or alternatively, the equipment parameter value can include a value of the charging apparatus 22 of the device system, which is designed to charge the device 20 or to supply it with electrical energy. Here, the value of the charging apparatus 22 can include, for example, a temperature, in particular on a surface of the charging apparatus 22, or a status of the charging apparatus 22. A charging process and/or a readiness for charging of the charging apparatus 22 can be detected as the status.

To detect the setting of the air conditioning system 24 of the motor vehicle, the detection device 16 can detect, for example, whether the air conditioning system 24 is switched on or off or has a predefined blower power. For this purpose, the air conditioning system 22 can have a control device which is designed to transmit or send the setting of the air conditioning system 24 to the detection device 16.

The control device 14 of the ventilation device 10 is designed to control the fan 12 at least subject to the detected equipment parameter value and the vehicle parameter value.

The fan 12 is designed to provide an air flow. The air flow is provided by the fan 12 as soon as the fan 12 is controlled or activated by the control device 14.

The control device 14 is designed to set or regulate a rotational speed of the fan 12 at least subject to the detected equipment parameter value and the vehicle parameter value.

Various forms of setting the ventilation device 10 are to be explained in more detail below:

A status of the charging apparatus 22 is specified as the equipment parameter value. The readiness for charging, e.g., whether the charging apparatus 22 is ready for charging and/or the charging apparatus 22 is active, can be specified as the status. In addition, the temperature on a surface of the charging apparatus 22, in particular on the surface on which the device 20 to be charged, particularly preferably the portable mobile terminal device, abuts or rests, is specified as the equipment parameter value. A temperature on the surface of greater than 40° C. is detected as the temperature. The vehicle speed is detected as the vehicle parameter value. In terms of vehicle speeds, a distinction is made between a vehicle speed of 0 to 5 km/h, a vehicle speed of 5 to 30 km/h, and a vehicle speed of more than 30 km/h. The rotational speed of the fan 12 is set subject to these equipment parameter values and vehicle parameter values. The rotational speed of the fan 12 is set with a rotational speed of the fan of 30%, 60%, or 100%.

In one form of setting, the fan 12 is not activated when the charging apparatus is not ready for charging and is not active, the temperature of the surface does not exceed 40° C., and the vehicle speed is below 5 km/h. In a further form of setting, the fan 12 is not activated when the charging apparatus 22 is ready for charging, the vehicle speed is 0 to 5 km/h, the charging apparatus is not active, and the temperature of the surface does not exceed 40° C. In a further form of setting, the fan 12 is activated at a rotational speed of the fan of 30% when the charging apparatus 22 is ready for charging and active, the vehicle speed is 0 to 5 km/h, and the temperature of the surface does not exceed 40° C. In a further form of setting, the fan 12 is activated at a rotational speed of the fan of 30% when the charging apparatus 22 is ready for charging, the charging apparatus 22 is not active, the temperature of the surface is above 40° C., and the vehicle speed is 0 to 5 km/h. In a further form of setting, the fan 12 is activated with a rotational speed of the fan of 100% when the charging apparatus 22 is ready for charging and active, the temperature of the surface is above 40° C., and the vehicle speed is 0 to 5 km/h. In a further form of setting, the fan 12 is not activated when the charging apparatus 22 is ready for charging, is not active, the temperature of the surface is not above 40° C., and the vehicle speed is 5 to 30 km/h. In a further form of setting, the fan 12 is activated with a rotational speed of the fan of 60% when the charging apparatus 22 is ready for charging and active, the temperature of the surface is not above 40° C. and the vehicle speed is 5 to 30 km/h. In a further form of setting, the fan 12 is activated at a rotational speed of the fan of 60% when the charging apparatus 22 is ready for charging but not active, the temperature of the surface is above 40° C., and the vehicle speed is 5 to 30 km/h. In a further form of setting, the fan 12 is activated at a rotational speed of the fan of 100% when the charging apparatus 22 is ready for charging and active, the temperature of the surface is above 40° C., and the vehicle speed is 5 to 30 km/h. In a further form of setting, the fan 12 is not activated when the charging apparatus is ready for charging but not active, the temperature of the surface is not above 40° C., and the vehicle speed is above 30 km/h. In a further form of setting, the fan 12 is activated at a rotational speed of the fan of 100% when the charging apparatus 22 is ready for charging and active, the temperature of the surface is not above 40° C., and the vehicle speed is above 30 km/h. In a further form of setting, the fan 12 is activated at a rotational speed of the fan of 100% when the charging apparatus 22 is ready for charging but not active, the temperature of the surface is above 40° C., and the vehicle speed is above 30 km/h. In a further form of setting, the fan 12 is activated at a rotational speed of the fan of 100% when the charging apparatus 22 is ready for charging and active, the temperature of the surface is above 40° C., and the vehicle speed is above 30 km/h.

The setting of the air conditioning system 24 can also be taken into consideration as an additional variable. For example, it can be provided that the fan 12 is activated when the motor vehicle is stationary, e.g., has a vehicle speed of 0 km/h, but the air conditioning system is switched on, for example at 6 of 12. Further framework conditions for activating the fan 12 and/or setting the rotational speed of the fan are also conceivable.

In FIGS. 2 and 3, an embodiment of the charging apparatus 22 having a ventilation device 10 is shown.

FIG. 2 shows an embodiment of the charging apparatus 22 according to the present invention by way of example. The charging apparatus 22 has a primary coil device 26 and a first control device 28 operatively connected to it, at least for controlling the strength and duration of the alternating magnetic field that can be generated by the primary coil device 26. The first control device 28 is arranged in a housing 30. The first control device 28 can be the control device 14 already described in connection with FIG. 1 or a further control device of the charging apparatus 22. The housing 30 has a lower shell and a cover or an upper shell which is or can be connected to the lower shell. The lower shell has at least one air inlet opening 32 and the cover has at least one air outlet opening 34, in particular of the ventilation device 10. Furthermore, the cover has an outer side, the outer side serving at least partially as a support surface 36 for the device 20, in particular the mobile terminal device.

The charging apparatus 22 also has a heat sink 38, which is arranged in the housing 30. Heat sinks are well known from the prior art and, like the heat sink 38 used according to the invention, consist of a metal suitable for this purpose, such as aluminum, or copper, or cast iron. Furthermore, the heat sink 38 can have cooling ribs, and/or cooling fins, and/or cooling pins. In an installed state of the heat sink 38, the cooling ribs, and/or cooling fins, and/or cooling pins are preferably arranged on a side of the heat sink 38 facing away from the first control device 28. The charging apparatus 22 can also have more than one heat sink 38.

The heat sink 38 is preferably arranged adjacent to the first control device 28, particularly preferably immediately adjacent to the first control device 28, where one or more heat conducting elements, such as heat conducting pads, can also be arranged between the heat sink 38 and the first control device 28. Alternatively, the heat sink 38 can also be arranged between the primary coil arrangement 26 and the first control device 28.

Furthermore, the charging apparatus 22 includes the ventilation device 10, which includes the fan 12, which can also be referred to as, in particular, an active, air supply device. The fan 12 can be designed as an axial fan, or as a radial fan, or as a tangential fan or as a synthetic jet. It can be provided that the fan 12 is arranged or attached to the heat sink 38. The fan 12 is designed to generate an air flow for the heat sink 38. In this case, ambient air can be supplied to the ventilation device 10 through the at least one air inlet opening 32 by the fan 12. Through the housing 30 provided for the charging apparatus 22, at least some of the air sucked in by the fan 12 can exit again through the at least one air outlet opening 34.

As shown in FIG. 2, the fan 12 is preferably arranged in the at least one air inlet opening 32 of the housing 30, where, in this case, "in" also means flush, at least partially "in front of" or "behind" the air inlet opening 32. In this way it can be ensured that at least predominantly only ambient air is sucked in from outside the housing 30 and passed into the housing 30, in particular to the heat sink 38.

The fan 12 of the ventilation device 10 of the charging apparatus 22 can be activated under the boundary conditions explained in connection with FIG. 1. In addition, it can be provided that the fan 12 is also activated if and for as long as a predefinable first limit temperature of the heat sink 38 is reached or exceeded. In order to make this possible, a temperature sensor device 40 for detecting the temperature of the heat sink 38 is assigned to the heat sink 38. In addition, the charging apparatus 22 can have a second control device 42 for this purpose, which is in signal connection with the temperature sensor device 40 and is operatively coupled to that of the ventilation device 10, in particular the fan 12. According to this embodiment, the second control device 42 is designed to activate the fan 12 as soon as and for as long as a predeterminable first limit temperature of the heat sink 38 is reached or exceeded. A temperature of 40° C., 41° C., 42° C., 43° C., 44° C., or 45° C., for example, can be specified as the first limit temperature.

In the case of the charging apparatus 22, the at least one air outlet opening 34 is advantageously arranged in a predeterminable boundary region R of the side of the housing 30, the outside of which serves at least partially as a support surface 36 for the mobile terminal device, such that the at least one air outlet opening 34, in an installed state of the housing 30, is offset horizontally by a predeterminable distance value A with respect to the part of the first control device 28 which is closest to the at least one air outlet opening 34.

In the charging apparatus 22 according to the present invention, the at least one air outlet opening 34 can be designed in such a way that the direction of flow of the air exiting through it has an acute angle with respect to the support surface 36. This acute angle is not particularly limited, but is preferably in the range of 0°, in particular the direction of flow of the exiting air parallel to the surface of the support surface 36, and approximately 30°.

In a particularly safe manner, "ventilation" from the rear of a device 20 lying on the support surface 36 of the charging apparatus 22 can be achieved if, as provided in accordance with a further advantageous development of the invention, the support surface 36 has spacer elements through which a predeterminable distance is ensured between the support surface 36 and a support side of the mobile terminal device. The spacer elements are preferably arranged on the support surface 36 in such a way that they achieve an air flow distributed over the largest possible area below a mobile terminal device resting on the spacer elements.

As shown in FIG. 2, the charging apparatus 22 or the ventilation device 10 can furthermore optionally have a protective device 44, for example in the form of a ventilation grille. The fan 12 can thus be protected from mechanical damage.

FIG. 3 shows a further embodiment of the charging apparatus 22 having the ventilation device 10 for wireless charging of an electrical energy storage of a mobile terminal device. The charging apparatus 22 can be arranged in a motor vehicle 46. The motor vehicle 46 is illustrated only schematically by the dashed line shown in FIG. 3. Furthermore, the charging apparatus 22 is shown schematically in a cross section.

The charging apparatus 22 includes charging electronics 48, which are arranged in a housing 30 of the charging apparatus 22. The charging electronics 48 can include the usual components, which are not shown here, such as a coil device, by means of which a time-varying magnetic field can be provided, which induces a current in a corresponding secondary coil of the mobile terminal device during a charging process. Furthermore, the charging apparatus 22 has a control device for controlling the charging process, as well as a connection device for connecting a power supply, converter devices, or other electrical and/or electronic components. The control device can be the control device 14 already described in connection with FIG. 1 or a further control device of the charging apparatus 22.

In order to protect the charging apparatus 22 and/or the device that is charged by the charging apparatus 22, such as the mobile terminal device, from excessive heating during a charging process, the charging apparatus 22 has the ventilation device 10. For this purpose, the housing 30 has an air inlet opening 32, an air outlet opening 34, and the fan 12. This fan 12 is designed to suck air, which is illustrated by the arrows 50, into the air inlet opening 32, and convey it out along the first air conveying path 52 provided within the housing 30, which extends from the air inlet opening 32 to the air outlet opening 34, and to blow out said air from the air outlet opening 34. The first air delivery path 52 leads past the charging electronics 48. In addition, the air 50 which is sucked in or blown out can also be used to cool the device, which is described in more detail later.

It is particularly advantageous here that both the air inlet opening 32 and the air outlet opening 34 are arranged in a first side of the housing 30, which also defines an upper side of the housing 30, and by means of which the support surface 36 for placing the device 20 on for the purpose of charging is provided. The fan 12 can be arranged at any desired position within the first air conveying path 52, in particular also directly at the air inlet opening 32 or the air outlet opening 34, and at any desired position in between. A position below the charging electronics 48 is particularly advantageous, since there is usually sufficient space here for positioning the fan 12.

The air inlet opening 32 and the air outlet opening 34 are also preferably arranged on opposite boundary regions R which limit the length L of the charging apparatus 32, which here extends in the x-direction with respect to the coordinate system shown in FIG. 3. As a result, cooling air can flow through the entire housing 30, which allows for particularly efficient cooling. An air duct 54 usually also runs through the central console for guiding the air for the rear passengers of the motor vehicle 10, which duct is also shown schematically here in FIG. 3.

Overall, the examples show how the invention provides an air controller for a charging apparatus, in particular for a wireless charger.

According to a particularly preferred embodiment, the fan is controlled subject to one, or different, or a plurality of boundary parameters. As a boundary parameter, it is at least taken into consideration whether a charging process is active, a speed of the motor vehicle, e.g., a speed signal of the motor vehicle, and a surface temperature of the charger or the charging apparatus.

The invention claimed is:

1. A method for operating a ventilation device for providing an air flow, the method comprising:
    detecting an equipment parameter value of an equipment element of a motor vehicle and a vehicle parameter value of the motor vehicle; and
    activating the ventilation device based on the equipment parameter value and the vehicle parameter value by setting a rotational speed of a fan of the ventilation device,
    wherein the rotational speed is varied based on the equipment parameter value and the vehicle parameter value,
    wherein the vehicle parameter value comprises a speed of the motor vehicle, which is detected as a vehicle parameter,
    wherein the detecting the equipment parameter value comprises detecting a device parameter value of a device system to be ventilated with the ventilation device, the device system comprising a charging apparatus configured to charge a mobile terminal device of the device system or the mobile terminal device, and
    wherein the detecting the device parameter value comprises detecting a temperature and a status of the device system, the status of the device system comprising a status of a charging process of the charging apparatus or of the mobile terminal device.

2. The method according to claim 1, wherein the detecting the device parameter value comprises detecting the temperature on a device surface of the charging apparatus or of the mobile terminal device of the device system.

3. The method according to claim 1, wherein the detecting the device parameter value comprises detecting a status of a readiness for charging of the charging apparatus or of the mobile terminal device.

4. The method according to claim 1, wherein the activating the ventilation device comprises activating the ventilation device at a temperature of over 30° C.

5. The method according to claim 1, wherein the activating the ventilation device comprises activating the ventilation device at a temperature of over 40° C.

6. The method according to claim 1, wherein the activating the ventilation device comprises activating the ventilation device in response to detecting a charging process of the device system as the status.

7. The method according to claim 1, wherein the vehicle parameter value comprises at least one of an interior parameter value in an interior of the motor vehicle, an interior temperature, or a noise level detected as the interior parameter value.

8. The method according to claim 1, wherein the activating the ventilation device comprises activating the ventilation device from the speed of the motor vehicle being 5 km/h.

9. The method according to claim 1, wherein the activating the ventilation device comprises activating the ventilation device from the speed of the motor vehicle being between 5 km/h and 30 km/h.

10. The method according to claim 1, wherein the activating the ventilation device comprises activating the ventilation device from the speed of the motor vehicle being 30 km/h.

11. The method according to claim 1, wherein the setting the rotational speed of the fan of the ventilation device comprises setting, based at least on the equipment parameter value and the vehicle parameter value, the rotational speed of the fan of the ventilation device between 10% and 100%.

12. The method according to claim 1, wherein the setting the rotational speed of the fan of the ventilation device comprises setting, based at least on the equipment parameter value and the vehicle parameter value, the rotational speed of the fan of the ventilation device between 30% and 100%.

13. The method according to claim 1, wherein the setting the rotational speed of the fan of the ventilation device comprises setting, based at least on the equipment parameter value and the vehicle parameter value, the rotational speed of the fan of the ventilation device at 30%, 60% or 100%.

14. The method according to claim 1, further comprising:
    detecting, in addition to the equipment parameter value and the vehicle parameter value, a setting of an air conditioning system of the motor vehicle, wherein the rotational speed of the fan varies based on the equipment parameter value, the vehicle parameter value, and the setting of the air conditioning system.

15. A ventilation device for providing an air flow, the ventilation device comprising:
    a fan configured to generate the air flow;
    a detection device configured to detect an equipment parameter value of an equipment element of a motor vehicle and a vehicle parameter value of the motor vehicle; and
    a control device configured to activate the ventilation device based on the equipment parameter value and the vehicle parameter value by setting a rotational speed of the fan, wherein the control device is configured to vary the rotational speed based on the equipment parameter value and the vehicle parameter value,
    wherein the vehicle parameter value comprises a speed of the motor vehicle and the detection device is configured to detect the speed as a vehicle parameter,
    wherein the detection device is configured to detect a device parameter value of a device system to be ventilated with the ventilation device as the equipment parameter value, the device system comprising a charging apparatus configured to charge a mobile terminal device of the device system or the mobile terminal device, and
    wherein the detection device is configured to detect a temperature and a status of the device system as the device parameter value, the status of the device system comprising a status of a charging process of the charging apparatus or of the mobile terminal device.

16. A charging apparatus for wirelessly charging a rechargeable electrical energy storage of a device, the charging apparatus comprising:
    a ventilation device, comprising:
        a fan configured to generate an air flow;
        a detection device configured to detect an equipment parameter value of an equipment element of a motor vehicle and a vehicle parameter value of the motor vehicle; and
        a control device configured to activate the ventilation device based on the equipment parameter value and the vehicle parameter value by setting a rotational speed of the fan, wherein the control device is configured to vary the rotational speed based on the equipment parameter value and the vehicle parameter value,
        wherein the vehicle parameter value comprises a speed of the motor vehicle and the detection device is configured to detect the speed as a vehicle parameter,
        wherein the detection device is configured to detect a device parameter value of a device system to be ventilated with the ventilation device as the equipment parameter value, the device system comprising a charging apparatus configured to charge a mobile terminal device of the device system or the mobile terminal device, and wherein the detection device is configured to detect a temperature and a status of the device system as the device parameter value, the status of the device system comprising a status of a charging process of the charging apparatus or of the mobile terminal device.

17. A motor vehicle comprising the charging apparatus according to claim 16.

* * * * *